(12) United States Patent
Vandekerckhove et al.

(10) Patent No.: US 11,661,330 B2
(45) Date of Patent: May 30, 2023

(54) DISPENSING APPARATUS FOR INFUSING CARBONATED BEVERAGE LIQUID WITH INGREDIENTS AND METHOD THEREOF

(71) Applicant: Anheuser-Busch InBev S.A., Brussels (BE)

(72) Inventors: Stijn Vandekerckhove, Leuven (BE); Aaron Penn, Leuven (BE)

(*) Notice: Subject to any disclaimer, the term of this patent is extended or adjusted under 35 U.S.C. 154(b) by 684 days.

(21) Appl. No.: 16/320,967

(22) PCT Filed: Jul. 25, 2017

(86) PCT No.: PCT/EP2017/068761
§ 371 (c)(1),
(2) Date: Jan. 25, 2019

(87) PCT Pub. No.: WO2018/019830
PCT Pub. Date: Feb. 1, 2018

(65) Prior Publication Data
US 2019/0169016 A1     Jun. 6, 2019

(30) Foreign Application Priority Data

Jul. 26, 2016     (EP) .................... 16181170

(51) Int. Cl.
*B67D 1/12*     (2006.01)
*B67D 1/00*     (2006.01)
(Continued)

(52) U.S. Cl.
CPC ......... *B67D 1/1252* (2013.01); *B67D 1/0009* (2013.01); *B67D 1/0043* (2013.01);
(Continued)

(58) Field of Classification Search
CPC .. B67D 1/1252; B67D 1/0009; B67D 1/0071; B67D 1/0075; B67D 1/06;
(Continued)

(56) References Cited

U.S. PATENT DOCUMENTS 1,780,687 A * 11/1930 Smith ................. B01F 3/04744
                                                                239/20
3,728,899 A *  4/1973 Dijkema ................ G01L 19/04
                                                                73/708

(Continued)

FOREIGN PATENT DOCUMENTS

CN         102188162         9/2011
CN         102827717        12/2012
(Continued)

*Primary Examiner* — Timothy L Maust
(74) *Attorney, Agent, or Firm* — Klintworth & Rozenblat IP LLP (57) ABSTRACT

A dispensing apparatus is described having a beverage source, containing a carbonated beverage liquid, and a dispensing tap. The dispensing apparatus includes a dispense tube disposing the beverage source in fluid communication with the dispensing tap and an infusion chamber arranged in connection with the dispense tube and configured to infuse an infusing ingredient with the carbonated beverage liquid. The dispensing apparatus includes a sensing unit configured to determine a level of carbon-dioxide in the liquid downstream of the infusion chamber. The dispensing apparatus includes a carbon-dioxide source coupled to the dispense tube via a valve. The dispensing apparatus further includes a control unit configured to operate the valve to allow flow of carbon-dioxide gas based on the determined level of carbon-dioxide in the carbonated beverage liquid, so as to bring the level of carbon-dioxide to a pre-defined level.

11 Claims, 9 Drawing Sheets

(51) Int. Cl.
*B67D 1/06* (2006.01)
*C12C 11/11* (2019.01)
*B67D 1/08* (2006.01)
*C12G 3/06* (2006.01)
*C12C 5/02* (2006.01)

(52) U.S. Cl.
CPC ......... *B67D 1/0071* (2013.01); *B67D 1/0075* (2013.01); *B67D 1/06* (2013.01); *B67D 1/08* (2013.01); *C12C 5/026* (2013.01); *C12C 11/11* (2013.01); *C12G 3/06* (2013.01); *B67D 2001/1263* (2013.01)

(58) Field of Classification Search
CPC ....... B65D 2001/1263; B01F 3/04787–04815; A47J 31/407; F17C 13/04; C12C 11/11
See application file for complete search history.

(56) References Cited

U.S. PATENT DOCUMENTS

| | | | | |
|---|---|---|---|---|
| 3,981,328 | A * | 9/1976 | Yonezawa | F16K 1/302 |
| | | | | 137/614.2 |
| 4,850,269 | A * | 7/1989 | Hancock | B01F 3/04241 |
| | | | | 99/323.1 |
| 5,029,733 | A * | 7/1991 | Hedderick | B67D 1/0004 |
| | | | | 222/96 |
| 7,288,276 | B2 | 10/2007 | Rona et al. | |
| 8,245,629 | B2 * | 8/2012 | Little | C12C 5/026 |
| | | | | 99/322 |
| 8,348,243 | B2 | 1/2013 | Schori et al. | |
| 9,955,710 | B2 * | 5/2018 | Hyde | A47J 31/40 |
| 2010/0151083 | A1 | 6/2010 | Klier et al. | |
| 2010/0260914 | A1 * | 10/2010 | Seta | A23L 2/54 |
| | | | | 426/590 |
| 2014/0272006 | A1 | 9/2014 | Schuh et al. | |
| 2015/0037464 | A1 | 2/2015 | McHale et al. | |
| 2015/0191684 | A1 | 7/2015 | Kyle | |
| 2015/0247110 | A1 * | 9/2015 | Dale | C12C 5/026 |
| | | | | 426/592 |
| 2017/0183610 | A1 * | 6/2017 | Kyle | B67D 1/0437 |

FOREIGN PATENT DOCUMENTS

| | | |
|---|---|---|
| JP | 2004-528969 | 9/2004 |
| JP | 2015-67326 | 4/2015 |
| WO | WO 02/081067 | 10/2002 |
| WO | WO 2014/062915 | 4/2014 |
| WO | WO 2016/046378 | 3/2016 |
| WO | WO 2016/069066 | 5/2016 |

* cited by examiner

DISPENSING APPARATUS FOR INFUSING CARBONATED BEVERAGE LIQUID WITH INGREDIENTS AND METHOD THEREOF

TECHNICAL FIELD

The present disclosure generally relates to a dispensing apparatus for a carbonated beverage liquid and more particularly relates to a dispensing apparatus for infusing solid ingredients with a carbonated beverage liquid and a method thereof.

BACKGROUND

A select number of gases are used in the beverage industry for preparation of beverage products. Some beverage products rely on bubble formation to achieve taste characteristics and/or visual appeal. Notably, the most common type of gas employed for beverage liquids is carbon-dioxide ($CO_2$). This process of introducing carbon-dioxide in the beverage is known as carbonation of beverage. Notably, carbon-dioxide gas is used in restaurants and bars to pressurize draft beverage lines, such as in a keg.

Also it is a common practice to introduce flavor components in the beverage products. One general approach is to mix a concentrate of the flavored component that completely dissolves or is completely dispersed in the beverage. The mixing process, generally, involves use of some blending device which agitates/stirs the beverage liquid. However, when mixing a concentrate in a carbonated liquid, sometimes there is a problem of "break-out" of carbon-dioxide gas. Further, for carbonated beverages such as beer, the mixing process may lead to excessive foaming of the beer (due to agitation), which may result in not only a loss of carbon-dioxide gas but also of proteins which are important to the taste and feel of the beer. Such loss cannot be compensated by just replenishing carbon-dioxide gas in the beer.

Some beverage manufacturers choose infusing desired flavors into the beverages, which has also been a favored practice among many brewers. Infusion is the process of extracting chemical compounds or flavors from plant material in a solvent such as water, oil or alcohol, by allowing the material to remain suspended in the solvent over time. Infusion systems are known for imparting new and interesting flavor profiles to beverages such as beer. Various ingredients, having desirable aromatic, visual, and/or taste components are used as infusing ingredients to augment beverage characteristics. However, very little has been researched in terms of infusing solid ingredients into carbonated beverages, such as, beer. It has been found that infusing of the flavor ingredients may help to overcome the drawbacks of mixing the ingredient with the carbonated beverage. That said, when infusing a carbonated beverage with solid ingredients, such as lemon or orange, it has been noticed that some of the carbon-dioxide gas from the beverage is scavenged by the ingredients infused therewith. This, generally, results in an infused beverage with sub-optimal carbon-dioxide gas content.

Some techniques have been tried to minimize this reduction in level of carbon-dioxide gas. One approach employed is keeping the beverage at low temperatures. Cooling down the beverage promotes more carbon-dioxide gas to dissolve in the beverage liquid and further reduces the precipitation of the carbon-dioxide gas, in the form of bubbles, out of the beverage liquid. However this technique has limitations and may not be sufficient to keep the level of carbon-dioxide gas to the initial/desired level. Other approach is to apply constant pressure during the infusion process. However, this approach is also unsuccessful in infusion of carbonated beverages with solid ingredients, because reduction in carbonation level is mainly due to binding of CO2 from the carbonated beverage liquid to the ingredient, and applying any additional pressure, etc. could not mitigate the loss of carbon-dioxide gas.

Therefore, there is a need for beverage dispensing apparatus which can carry out the infusion process for infusing the flavor components from an infusing ingredient into a carbonated beverage and further be capable to replenish the beverage to compensate for any loss of carbon-dioxide gas due to scavenging by the infusion process.

SUMMARY

In one aspect of the present disclosure, a dispensing apparatus is provided. The dispensing apparatus includes a beverage source containing a carbonated beverage liquid and a dispensing tap. The dispensing apparatus further includes a dispense tube disposing the beverage source in fluid communication with the dispensing tap. The dispensing apparatus further includes an infusion chamber arranged in connection with the dispense tube between the beverage source and the dispensing tap to receive the carbonated beverage liquid. The infusion chamber is configured to infuse an infusing ingredient with the carbonated beverage liquid. The dispensing apparatus further includes a sensing unit configured to determine a level of carbon-dioxide in the carbonated beverage liquid in the dispense tube downstream of the infusion chamber. The dispensing apparatus further includes a carbon-dioxide source coupled to the dispense tube via a valve. The dispensing apparatus further includes a control unit configured to operate the valve to allow flow of carbon-dioxide gas, from the carbon-dioxide source, to the carbonated beverage liquid based on the determined level of carbon-dioxide in the carbonated beverage liquid, so as to bring the level of carbon-dioxide to a pre-defined level.

In another aspect of the present disclosure, a method for dispensing a carbonated beverage liquid is provided. The method comprises infusing an infusing ingredient with the carbonated beverage liquid. The method further comprises determining a level of carbon-dioxide in the carbonated beverage liquid post the infusion. The method further comprises passing carbon-dioxide gas to the carbonated beverage liquid based on the determined level of carbon-dioxide in the carbonated beverage liquid, so as to bring the level of carbon-dioxide to a pre-defined level.

The details of one or more implementations are set forth in the accompanying drawings and the description below. Other aspects, features and advantages of the subject matter disclosed herein will be apparent from the description, the drawings, and the claims.

DETAILED DESCRIPTION

Detailed embodiments of the present disclosure are described herein; however, it is to be understood that disclosed embodiments are merely exemplary of the present disclosure, which may be embodied in various alternative forms. Specific process details disclosed herein are not to be interpreted as limiting, but merely as a basis for the claims and as a representative basis for teaching one skilled in the art to variously employ the present disclosure in any appropriate implementation.

Figure 1:
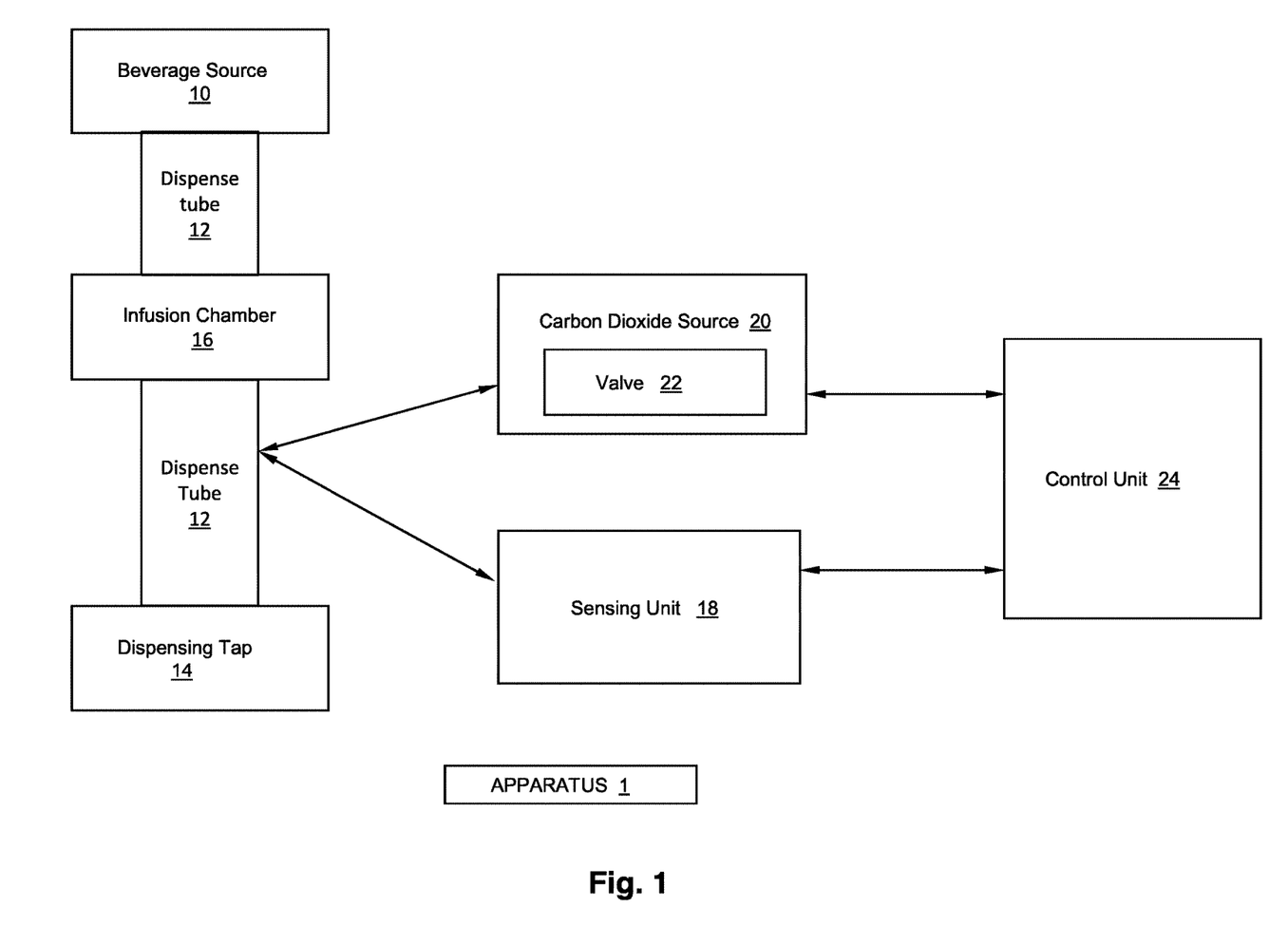
FIG. 1 is a block diagram of a dispensing apparatus, in accordance with one embodiment of the present disclosure.
Figure 2:
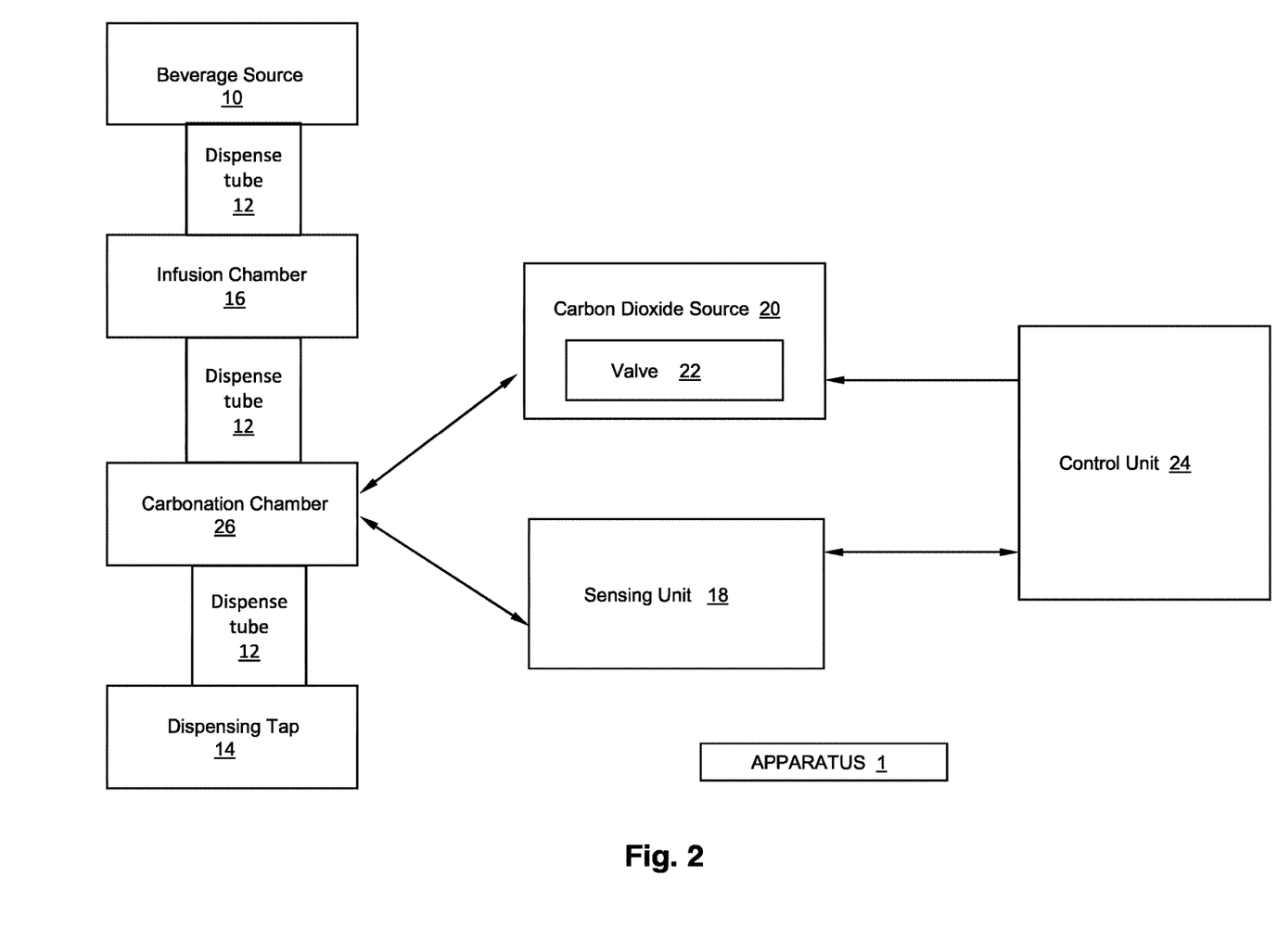
FIG. 2 is a block diagram of the dispensing apparatus, in accordance with another embodiment of the present disclosure.

In description of the FIGS. 1-2 that follow, elements common to the schematic system will have the same number designation unless otherwise noted. In a first embodiment, as illustrated in FIG. 1, the present disclosure provides an apparatus 1 for dispensing a carbonated beverage liquid, comprising a beverage source 10 containing the carbonated beverage liquid, the beverage source 10 capable of being pressurized; a dispense tube 12 disposing the beverage source 10 in fluid communication with a dispensing tap 14; an infusion chamber 16 fluidly connected to the dispense tube 12 downstream the beverage source 10 and configured to assist an infusion process between the carbonated beverage liquid and a solid ingredient. The infusion chamber 16 is in fluid communication with the dispensing tap 14. The apparatus further includes a sensing unit 18 and a carbon dioxide source 20 configured with a valve 22, connected to the dispense tube 12 downstream the infusion chamber 16. Further, the apparatus includes a control unit 24 for opening/closing the valve 22 of the carbon dioxide source 20 wherein the carbon dioxide is fed to the dispense tube 12 downstream the infusion chamber 16 on the basis of the output received by the control unit 24 from the sensing unit 18 connected to the dispense tube 12.

In a modification of the first embodiment, as illustrated in FIG. 2, the apparatus includes a carbonation chamber 26 fluidly connected to dispensing tube 12 and downstream to the infusion chamber 16. The carbonation chamber 26 simplifies the apparatus in that it provides a specific chamber for carbonation to take place. The carbonation chamber 26 is connected to the sensing unit 18 which senses the level of carbon dioxide in the infused carbonated liquid and sends an output to the control unit 24. The carbonation chamber 26 is further connected to the carbon dioxide source 20 configured with the valve 22 which on receiving a signal generated by the control unit 24, allows in-feeding of the carbon dioxide from the carbon dioxide source 20 to the carbonation chamber 26.

FIGS. 1 and 2 schematically show the arrangement of the basic components of the apparatus of the present disclosure. However, in the construction of commercial functional units secondary components such as safety regulators, valves, couplings, harnesses, pumps, support structure and other functional components known to one of skill in the beverage dispense technology may be incorporated in the system. Such commercial arrangements are included in the present invention as long as the structural components and arrangements disclosed herein are present.

Figure 3:
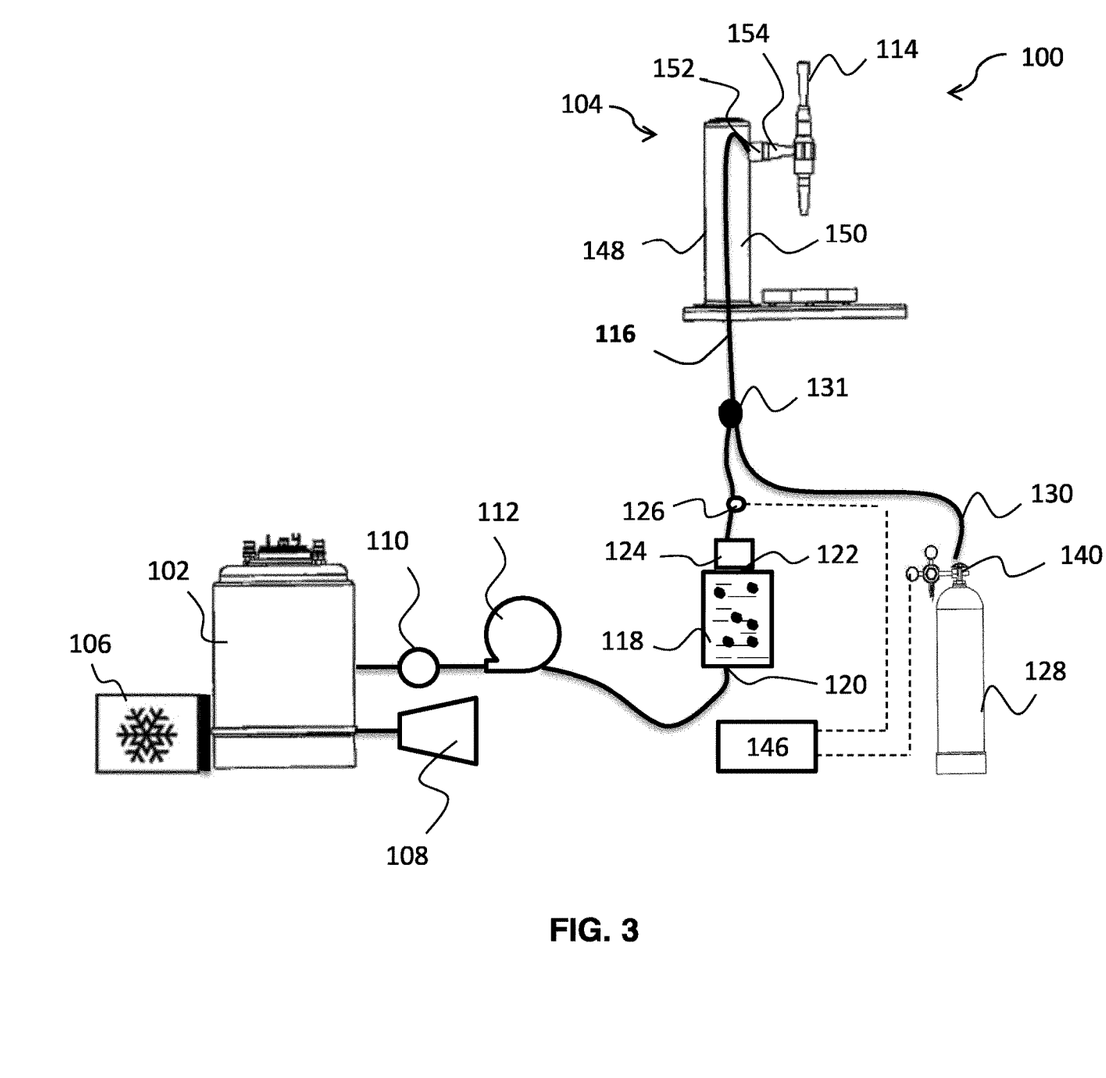
FIG. 3 is a schematic view of the dispensing apparatus, in accordance with one embodiment of the present disclosure.

Referring to FIG. 3, a dispensing apparatus, generally represented by numeral 100, is illustrated in accordance with an embodiment of the present disclosure. The dispensing apparatus 100 includes a beverage source 102 containing a carbonated beverage liquid, hereinafter simply referred to as liquid. In one example, the liquid preferably is a malt-based carbonated beverage, more preferably a fermented malt-based carbonated beverage, and most preferably a beer. Further, the beverage source 102 may in the form of any pressurized tank constructed of a material suitable for contact with beverages for human consumption. The beverage source 102 may be constructed so as able to withstand the high pressure of the liquid contained inside. Materials of construction may include but not limited to stainless steel or a plastic. In one example, the beverage source 102 is in the form of a keg cylinder closed at both ends, with the cylinder formed from a food-grade material, such as food-grade stainless steel.

The dispensing apparatus 100 further includes a dispensing assembly 104. The dispensing assembly 104 is disposed in fluid commination with the beverage source 102. The dispensing assembly 104 may be attached to the beverage source 102 or located separately therefrom, depending on the type and space constrains for the dispensing apparatus 100. In some embodiments, the dispensing assembly 104 may be made of some plastic material like polypropylene, polyethylene terephthalate, or the like.

As depicted in FIG. 3, the dispensing assembly 104 may provide a dispensing tap 114. The dispensing tap 114 may be in the form of a faucet designed to dispense the liquid at a controlled rate to allow foam formation upon dispense and provide the unique flavor and appearance associated with the product obtained via dispense from the apparatus 100 of the present disclosure. In some examples, a restrictor nozzle (not shown) may be inserted in the tip of the dispensing tap 114 to further enhance the foam formation during dispense of the liquid therefrom. Restrictor nozzles providing differing characteristics to the dispensed liquid are widely known and commercially available. Additionally, a restrictor plate may be employed in place of or in combination with the nozzle to enhance the frothing effect of the dispensing assembly 104. Further, the dispensing assembly 104 may include a dispense tube 116 disposing the beverage source 102 in fluid communication with the dispensing tap 114. In some examples, the dispense tube 116 may be equipped with mass flow meters (not shown) which aids in regulating and maintaining the flow of liquid therein.

In some examples, the dispensing apparatus 100 may further include a refrigeration unit 106. The refrigeration unit 106 may be configured to keep the temperature of the liquid inside the beverage source 102 within a predefined temperature limit. Usually, the refrigeration unit 106 may be configured to keep the liquid at a temperature below the ambient temperature. Further, in some examples, the beverage source 102 may be connected with some pressurizing device 108, such as a compressed air cylinder or a compressor. The pressurizing device 108 may be configured to pressurize the liquid, in the beverage source 102, to flow from the beverage source 102 to the dispensing assembly 104. The beverage source 102 may be pressurized to the extent sufficient to force the liquid from the beverage source 102 to the dispensing assembly 104. In one example, the beverage source 102 may be provided with a siphon 110 so that all of the contents of the beverage source 102 may be drained. Further, in one example, the dispensing apparatus 100 may include a diaphragm pump 112 to pump the liquid from the beverage source 102 to the dispensing assembly 104. Diaphragm pumps are conventionally employed in industry for the pumping of beer, soda and other beverages, especially because such pumps are compatible with carbonated as well as non-carbonated liquids. It may be understood that other type of pumps may be employed which are suitable for pumping liquids intended for human consumption.

The dispensing apparatus 100 of the present disclosure further include an infusion chamber 118 arranged in connection with the dispense tube 116. In one example, the infusion chamber 118 may be disposed in line with the dispense tube 116, between the beverage source 102 and the dispensing tap 114. The infusion chamber 118 may be in the form of a cylindrical vessel disposed in fluid communication with the beverage source 102, via the dispense tube 116, to receive the liquid. It may be understood that while the infusion chamber 118 is represented cylindrical in shape, it could be of some other shape, such as a rectangular, hexagonal, or some arbitrary shape. Further, the infusion chamber 118 may be made of any suitable food-grade material. As schematically illustrated in FIG. 3, the infusion chamber 118 may provide an infusion chamber inlet 120 preferably proximal to its bottom and an infusion chamber outlet 122 preferably proximal to its top. It may be contemplated that by filling the infusion chamber 118 from the bottom, via the infusion chamber inlet 120, the liquid gradually fills from the bottom to the top, thereby pushing most of the trapped air out of the infusion chamber 118.

The infusion chamber 118 may be configured to infuse an infusing ingredient, preferably but not limited to a solid flavoring ingredient with the liquid and thereby desorb flavor components therein. In order to infuse the liquid, the infusion chamber 118 provides an arrangement (not shown) to place ingredients inside thereof and thereby come in contact with the liquid. It may be contemplated by a person skilled in the art that the said arrangement may involve a retractable cover or the like. In one example, the infusion chamber 118 may be removably disposed from the dispense tube 116 to place or replace infusing ingredient therein, and further for cleaning purposes. In some examples, filters 124 may be provided in the infusion chamber 118 at the infusion chamber outlet 122. These filters 124 acts as a holding means for the infusing material when the infusion chamber 118 is drained of the liquid. One of ordinary skill in the art will appreciate that these filters 124 may be made from a variety of materials, such as a metal or plastic perforated screen or mesh or a micron filter and further be produced in a variety of shapes, sizes, and porosity and still achieve the desired filtering and containing effect. It may also be contemplated that a single filter, or multiple filters, could be used in a variety of possible configurations. Further, in some examples, the infusion chamber 118 may be surrounded by a thermoelectric unit (not shown) configured to control a temperature of the liquid during infusion, as required by the infusion process, mostly based on the type and properties of the infusing ingredient and the liquid. Such thermoelectric unit may be contemplated by a person skilled in the art and has not been described in detail for the brevity of the disclosure.

It may be understood that a variety of infusing ingredients may be used in order to infuse the liquid. For example, infusing ingredient can be a plant (such as mint), a flower (such as hops), a fruit (such as an orange, banana, cherry, blueberry, raspberry, or cranberry), a vegetable (such as a pepper or pumpkin), a bean (such as a vanilla or coffee), a nut or legume (such as a pistachio or peanut), a seed (such as cardamom), a wood (such as oak or oak soaked in a distilled spirit), a spice (such as cinnamon or pepper), an herb (such as lavender or rosemary), a root (such as ginger), an extract, a syrup (such as maple syrup), chocolate, candy, or any other type of flavoring item (such as an oil, resin, gel, or powder). Most typically, infusion imparts a new or enhanced flavor to the liquid, although the infusion could be done for other purposes, such as for imparting vitamins, boosters, or remedies for medicinal or health-related reasons to the liquid. These infusing ingredients may come in different forms, such as powders, liquids, solids, pastes, or particulates.

Further, the dispensing apparatus of the present disclosure includes a sensing unit 126 configured to determine a level of carbon-dioxide in the liquid flowing in the dispense tube 116 downstream of the infusion chamber 118. In particular, the sensing unit 126 may be positioned proximal to the infusion chamber outlet 122, specifically outside of the infusion chamber 118. In one example, the sensing unit 126 may be a manometer. In other example, the sensing unit 126 may be a transducer, such as one of an ultrasonic based meter, a capacitance based meter and a resistance based meter or any other type of pressure sensor. The sensing unit 126 may be configured to convert the determined pressure reading to an electronic signal. It may be understood that the pressure of the gaseous components in the liquid is proportional to the level of the carbon-dioxide gas in the liquid, and thus may be substituted for calculation and other purposes.

Figure 4:
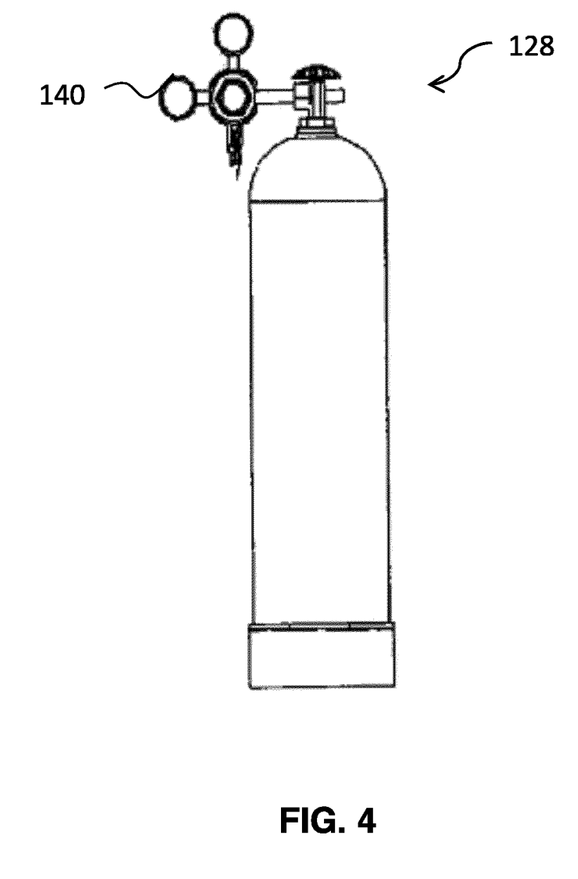
FIG. 4 is a planar view of a carbon-dioxide source, in accordance with an embodiment of the present disclosure.

Further, the dispensing apparatus 100 may include a carbon-dioxide source 128. FIG. 4 illustrates an exemplary embodiment of the carbon-dioxide source 128 which may be implemented with the dispensing apparatus 100 of the present disclosure. As illustrated, the carbon-dioxide source 128 may be in the form of a cylinder or a tank which is filled with compressed carbon-dioxide gas at a high pressure. The carbon-dioxide source 128 may be made of suitable material capable to withstand high pressure from inside, such as, but not limited to, stainless steel. In some examples, the carbon-dioxide source 128 may contain liquid carbon-dioxide and incorporates the usual pressure building circuitry to convert the liquid carbon-dioxide into the gaseous carbon-dioxide.

In an embodiment, as illustrated in FIG. 3, the carbon-dioxide source 128 may be directly coupled and disposed in fluid communication with the dispense tube 116, via a gas feed line 130, at a junction 131. The gas feed line 130 is connected to the carbon-dioxide source 128 at one end and to the dispense tube 116, downstream of the sensing unit 126, at other end. For convenience of replacement or renewal of the carbon-dioxide source 128, the gas feed line 130 may be coupled thereto using quick connect couplings (not shown) well known in the industry.

Figure 5:
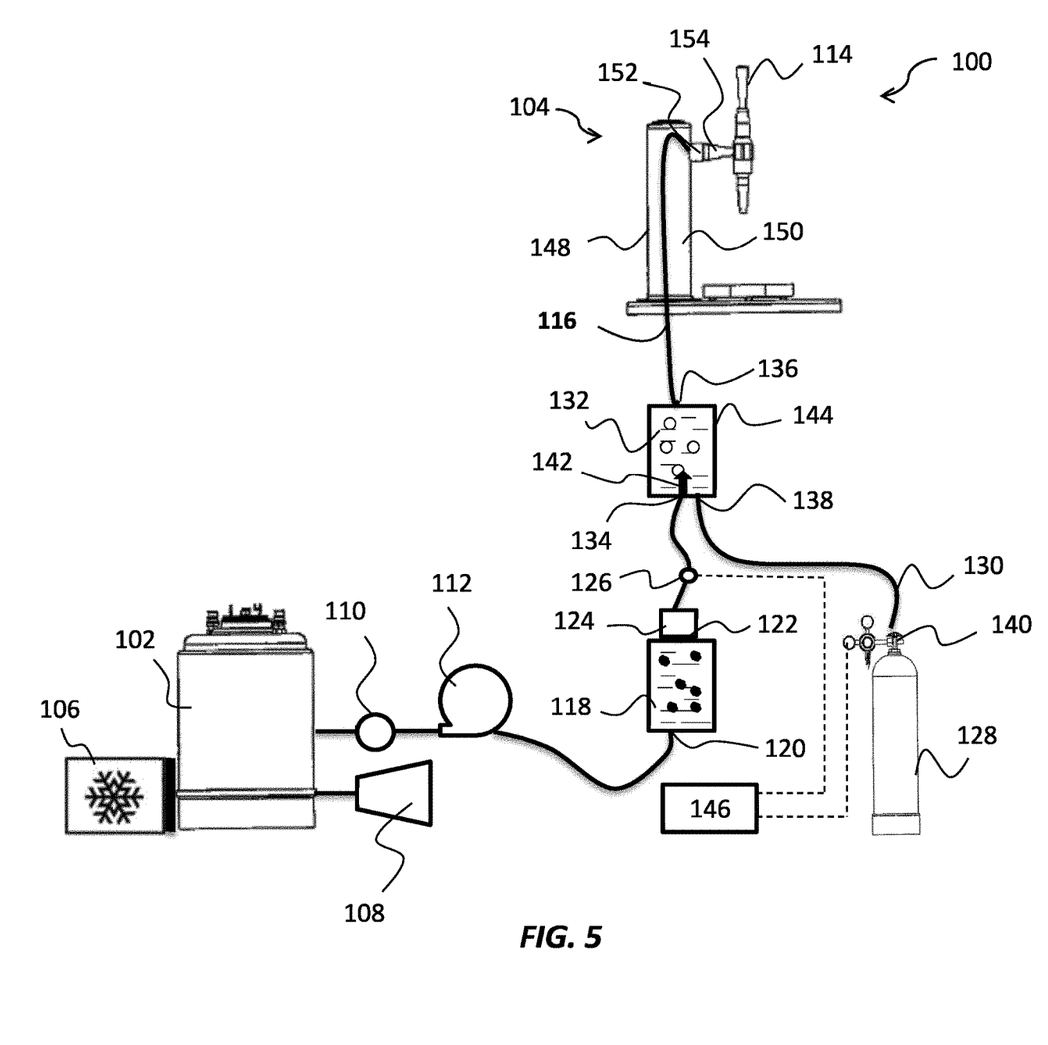
FIG. 5 is a schematic view of the dispensing apparatus, in accordance with another embodiment of the present disclosure.

In an alternate embodiment, as illustrated in FIG. 5, the dispensing apparatus 100 may include a carbonation chamber 132 disposed downstream of the infusion chamber 118. The carbonation chamber 132 includes a beverage inlet 134 in fluid communication with the infusion chamber 118, via the dispense tube 116, to receive the liquid therefrom. Further, the carbonation chamber 132 includes a beverage outlet 136 in fluid communication with the dispensing assembly 104, via the dispense tube 116, to pass the liquid to the dispensing tap 114. The carbonation chamber 132 further includes a carbon-dioxide inlet 138 in fluid communication with the carbon-dioxide source 128 to receive the pressurized carbon-dioxide gas therefrom, via the gas feed line 130. In one example, the carbon-dioxide inlet 138 may be positioned, generally, below a level of the liquid in the carbonation chamber 132 during regular use.

Referring back to FIG. 4, the carbon-dioxide source 128 may include a valve 140 configured to regulate the flow of the carbon-dioxide gas from the carbon-dioxide source 128. It may be seen that the valve 140 may be connected to the gas feed line 130, as illustrated in FIG. 3 and FIG. 5, preferably proximal to the end coupled to the carbon-dioxide source 128. In one example, the valve 140 may be a check valve in order to prevent the back flow of the carbon-dioxide gas to the carbon-dioxide source 128. Further, in some examples, the valve 140 may also act as a pressure relief valve and/or a pressure regulator in order to ensure that the gaseous carbon-dioxide is delivered at an appropriate pressure. In one example, the valve 140 may be an electronic valve, of which the opening and the closing may be controlled by sending appropriate signals. Such electronic valves uses solenoid means or the like, and are well known in the industry.

In some examples, the carbonation chamber 132 may include a sparging device 142 coupled to the carbon-dioxide inlet 138 for bubbling the carbon-dioxide gas through the liquid in the carbonation chamber 132. Further, in some examples, the carbonation chamber 132 may have transparent walls, schematically represented by numeral 144, so that the user could watch the bubbles as the carbon-dioxide gas is passed through the liquid. The transparent walls 144 may be made of any clear, food-safe material, such as but not limited to, for example glass, glass derivatives, polycarbonate, acrylic, or PET plastic compound. The walls 144 may further be vacuum jacketed to provide a layer of insulation between the carbonation chamber 132 and the outside. It may be understood that while having clear walls enhance the user's experience, such walls or vacuum jacketed walls are not required for the carbonation chamber 132 to perform the required function. For example, the walls 144 may be made of a non-transparent material, such as stainless steel or aluminum, or a combination of transparent and non-transparent materials, such as stainless steel with glass windows, and still fall within the scope of the present disclosure.

The dispensing apparatus 100 of the present disclosure further includes a control unit 146. It may be understood that the control unit 146 may be a computing device, including typical components like, a memory, a secondary storage device, a processor, an input device, a display device, and an output device. The memory may include random access memory (RAM) or similar types of memory and the secondary storage device may include some non-volatile means of data storage. Further, the processor may execute programs using data stored in the memory, the secondary storage, or received from the Internet or other network, to perform methods and functions described herein. As illustrated in FIG. 1, the control unit 146 may be disposed in signal communication with the sensing unit 126. The control unit 146 is configured to receive the electronic signals corresponding to the pressure reading, of the liquid downstream of the infusion chamber 118, by the sensing unit 126. Based on this reading value, the control unit 146 may determine the existing level of the carbon-dioxide gas in the liquid after completion of the infusion process. It may be contemplated by a person having ordinary skill in the art that the control unit 146 may be configured to estimate the said existing level by using look-up tables or relationship curves between the pressure and level of carbon-dioxide gas for a given volume of the liquid. Such techniques are widely known in the art and have not been explained for the brevity of the disclosure.

Further, the control unit 146 may determine the required level of carbon-dioxide for the liquid dispensing out of the dispensing tap 114. In one example, the said required level may be a predefined value set in a memory of the control unit 146. In other example, the control unit 146 may provide means to dynamically input the said required level by the user based on his/her preference. For this purpose, the control unit 146 may provide input means, such as a keyboard, a mobile app, or any other input means. For example, in some embodiments, the control unit 146 may be configured to be connected to a user interface (not shown) positioned anywhere on the apparatus, for example, on the dispensing assembly 104. In such embodiments, the user interface may include an input mechanism such as a dial, that allows a user to set a pressure/carbonation level (the pressure selected may determine the level of carbonation of the beverage). The selected pressure is received by the control unit 146, which then controls the valve 140 to begin the flow of $CO_2$ from the carbon-dioxide source 128 to the carbonation chamber 132. The Control unit 146 continues allowing $CO_2$ pressure to build until a predetermined pressure is reached. Alternatively, the control unit 146 may allow a specific amount of $CO_2$ to flow from the carbon-dioxide source 128 to the carbonation chamber 132 by calculating the difference between the required level and the existing level using algorithmic functions as would be contemplated by a person skilled in the art.

The control unit 146 is further configured to operate the valve 140 to regulate the flow of carbon-dioxide gas out from the carbon-dioxide source 128. The opening and closing of the valve 140 is controlled based on the calculated difference in order to allow a measured quantity of carbon-dioxide gas to mix with the liquid, downstream of the infusion chamber 118, either directly in the dispense tube 116 or the carbonation chamber 132. It may be understood that the valve 140 is regulated indirectly based on the level of carbon-dioxide in the liquid as determined by the sensing unit 126. The flow of the carbon-dioxide gas is controlled so as to bring the level of carbon-dioxide in the liquid, to be dispensed, to the pre-defined level or the desired level inputted by the user. The amount of carbon-dioxide absorbed by the liquid is controlled by the rate with which the carbon-dioxide gas is introduced in the carbonation chamber 132. In one example, the control unit 146 is configured to at least partially restore the level of carbon-dioxide in the liquid to a level prior to the infusion process, that is, to restore any carbon-dioxide lost in the liquid during the infusion process.

In some examples, the dispensing apparatus 100 may further include a feedback loop. In such configuration, the sensing unit 126 is further configured to determine a post-carbonation level of carbon-dioxide in the liquid in or downstream of the carbonation chamber 132, after the carbon-dioxide gas, from the carbon-dioxide source 128, has been passed there through. If the post-carbonation level is found to be less than the predefined/inputted level, the control unit 146 may be configured to further adjust the opening of the valve 140, based on the determined post-carbonation level of the carbon-dioxide in the liquid, so as to achieve the predefined level in the liquid to be dispensed.

FIG. 3 further illustrates an exemplary depiction of the dispensing assembly 104. The dispensing assembly 104 may include a tap housing 148. In the illustrated example, the tap housing 148 is shown in the form of a tower; however it may be understood that the tap housing 148 may be of any other shape as per the design requirements of the dispensing assembly 104. The tap housing 148 may define a hollow cylindrical space 150 with an opening 152 towards one end thereof. The dispensing assembly 104 may further include a tap head 154 mounted on the tap housing 148 at the opening 152. The tap head 154 may be fixedly or removably mounted on to the tap housing 148. It may be seen that the dispensing tap 114 is provided on the tap head 154. Further, the dispense tube 116 may run through and positioned inside the cylindrical space 150, and disposing the beverage source 102 in fluid communication with the dispensing tap 114.

In some examples, the dispensing apparatus 100 is arranged or constituted in a self-contained unit that may be conveniently shipped to and placed in a commercial establishment for preparation and dispensation of specialty gas infused chilled beverages. The self-contained unit provides a user friendly and convenient infused beverage preparation and dispensing apparatus especially suited for coffee bars, cafeterias, restaurants and other commercial establishments where beverages are served. In such configuration, the dispensing apparatus 100 may or may not include the refrigeration unit 106, capable of cooling the system components and beverage therein to a temperature less than ambient or room temperature, and other ancillary components therein. That said, if the cooling capability is not included in the apparatus, some provision to maintain the beverage in a cooled state may be made according to methods known to one of ordinary skill in the art. In other examples, the dispensing apparatus 100 may include a mounting panel housing which attaches to a wall panel and mounts some or all of the apparatus components to the wall panel. The arrangement of the component parts may be vertical or horizontal and may have components on opposite sides of the wall panel. For example, only the dispensing tap 114 may be visible on one side while the other functional components including the beverage source 102, the refrigeration unit 106, the infusion chamber 118, the carbonation chamber 132, pumps and lines are out of view on the opposite side of the wall panel.

Figure 6:
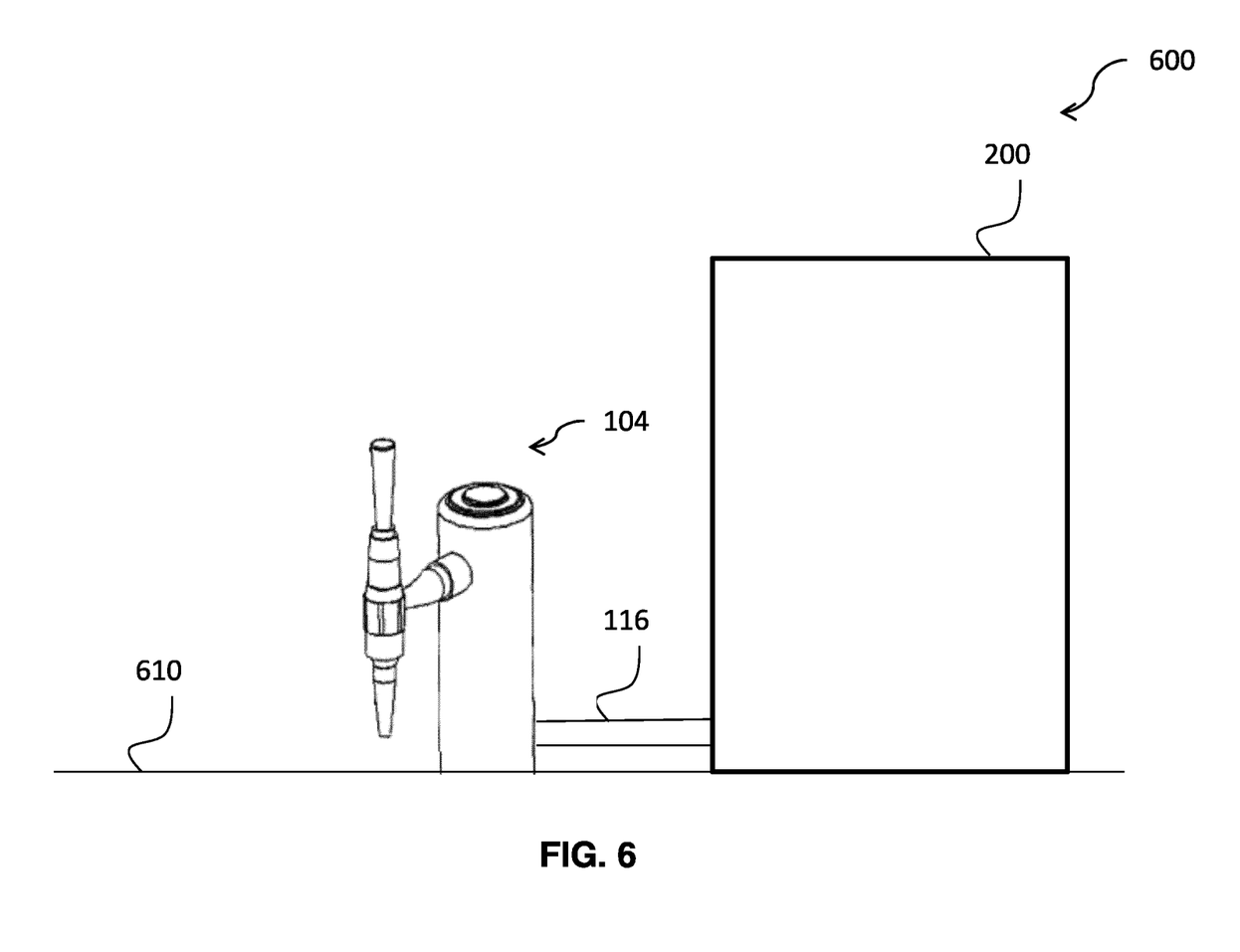
FIG. 6 is a schematic view of a fixed tower arrangement, in accordance with an embodiment of the present disclosure.
Figure 7:
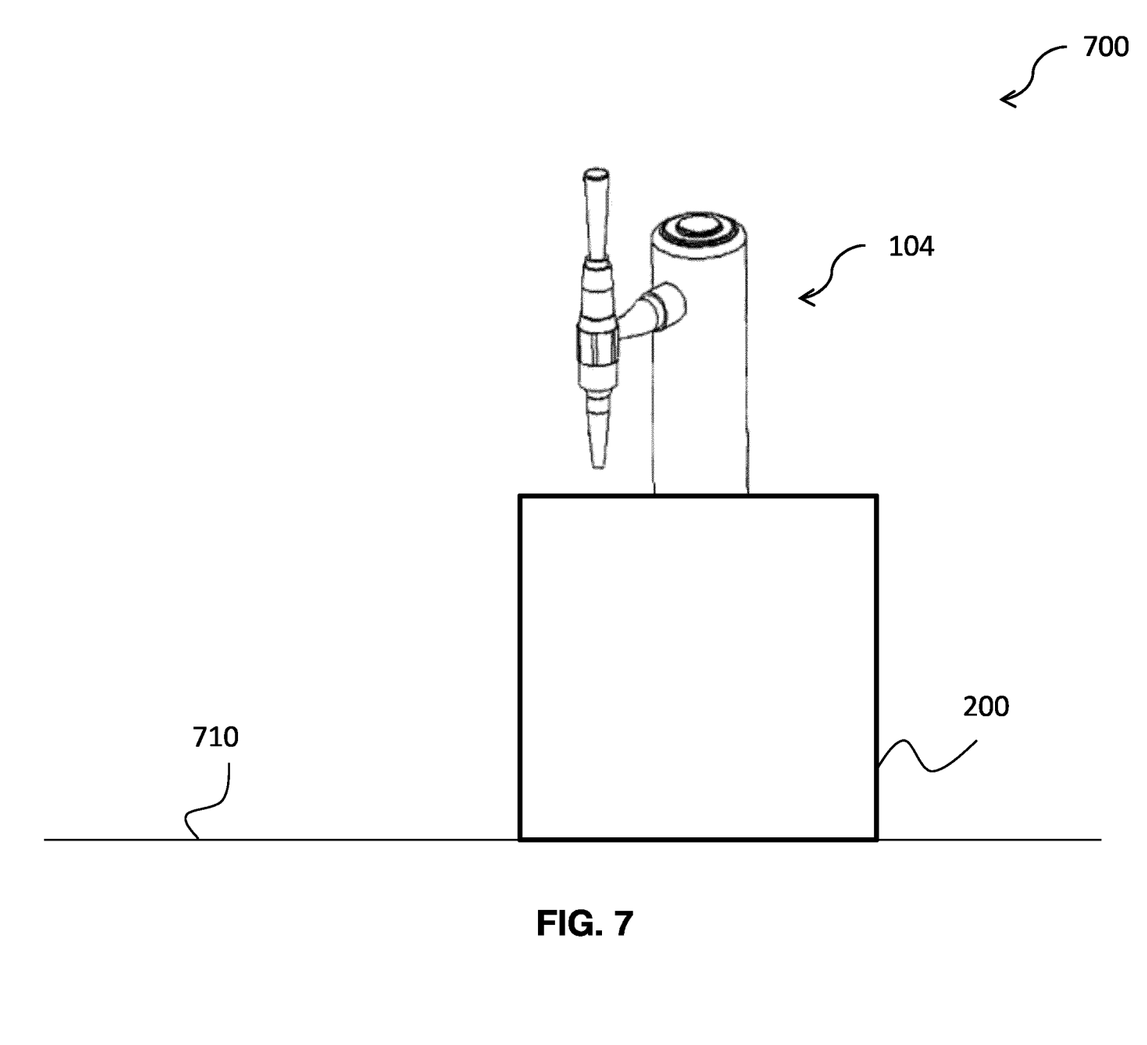
FIG. 7 is a schematic view of a counter tap tower, in accordance with an embodiment of the present disclosure.
Figure 8:
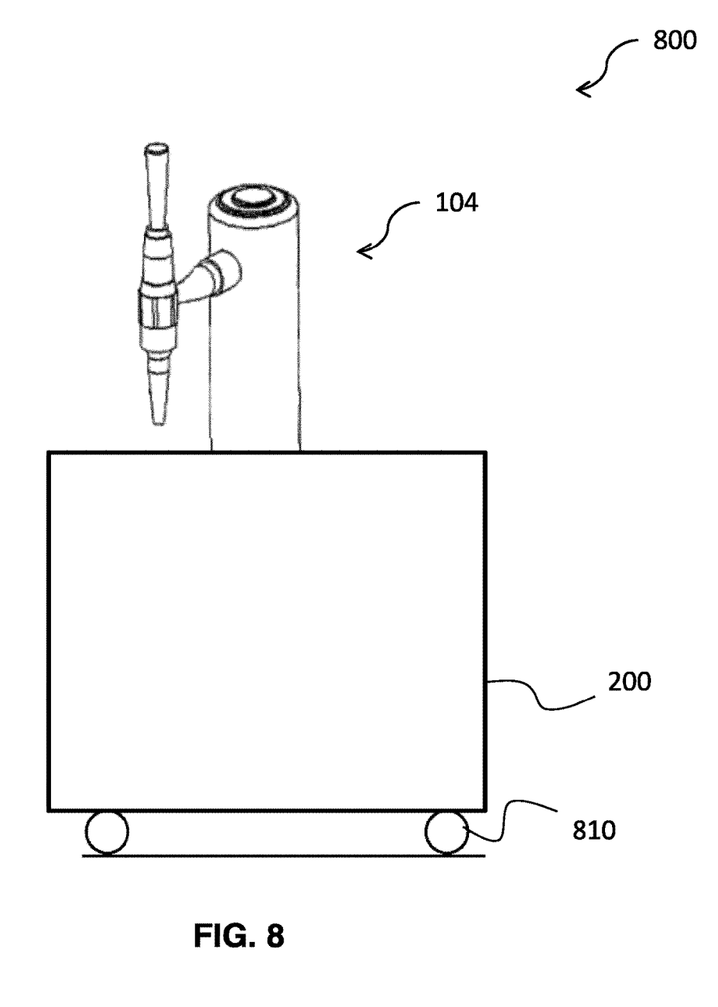
FIG. 8 is a schematic view of a roving tap tower, in accordance with an embodiment of the present disclosure.

FIGS. 6-8 illustrate implementation of the dispensing apparatus 100 of the present disclosure in some of the possible configurations. In such configurations, the dispensing assembly 104 may be one component and all other components of the dispensing apparatus 100, including the beverage source 102, the carbon-dioxide source 128, the infusion chamber 118, the carbonation chamber 132, etc. may be placed inside a housing 200. For example, FIG. 6 illustrates a planar view of a fixed tower arrangement 600, in accordance with an embodiment of the present disclosure. In the configuration of the fixed tower 600, the housing 200, with the beverage source 102 and other components, may be located separate from the dispensing assembly 104 and being in fluid communication through the dispense tube 116 to supply the beverage liquid. The beverage source 102 as well as the dispensing assembly 104 may be placed on a table, like table 610. Moving on, FIG. 7 illustrates a planar view of a counter tap tower 700, according to an embodiment of the present disclosure. In the configuration of the counter tap tower 700, the housing 200 may be fixedly connected to the dispensing assembly 104 and further in fluid communication with the beverage source 102, placed inside the housing 200. The entire arrangement of the dispensing assembly 104 may be positioned on top of the housing 200, which in turn may be placed on top of a table, like table 710. FIG. 8 illustrates a planar view of a roving tap tower 800, in accordance with an embodiment of the present disclosure. In the configuration of the roving tap tower 800, the housing 200 containing the beverage source 102 along with other components may support the dispensing assembly 104 on top thereof. Further the housing 200 may be provided with wheels 810 on the bottom to move the whole roving tap tower 800 as desired.

The present disclosure relates to a dispensing apparatus 100 for dispensing of liquids, such as beer, wine, cider, hard liquor (e.g., distilled beverage, spirit, liquor, hard alcohol, etc.), soft drinks (e.g., cola, soda, pop, tonic, seltzer), iced tea, soda water and other types of carbonated beverages. The dispensing apparatus 100 could be used to provide the end user with varieties of infused and flavored beverages with the desired level of carbon-dioxide. The dispensing apparatus 100 of the present disclosure restores the level of carbon-dioxide in the liquid to a level prior to the infusion process. Thus, at the bars and restaurants with high volume of serving drinks, the user does not have to worry about the loss of carbon-dioxide content in the infused drinks. Since the amount of carbon-dioxide absorbed by the liquid is dependent on the rate with which the carbon dioxide is introduced in the carbonation chamber 132, the dispensing apparatus 100 of the present disclosure could also be used to customize the level of carbonation in the liquid to satisfy a consumer's taste. The user thus has the option to create beverages having varying levels of carbonation to satisfy the palate of the consumer.

Figure 9:
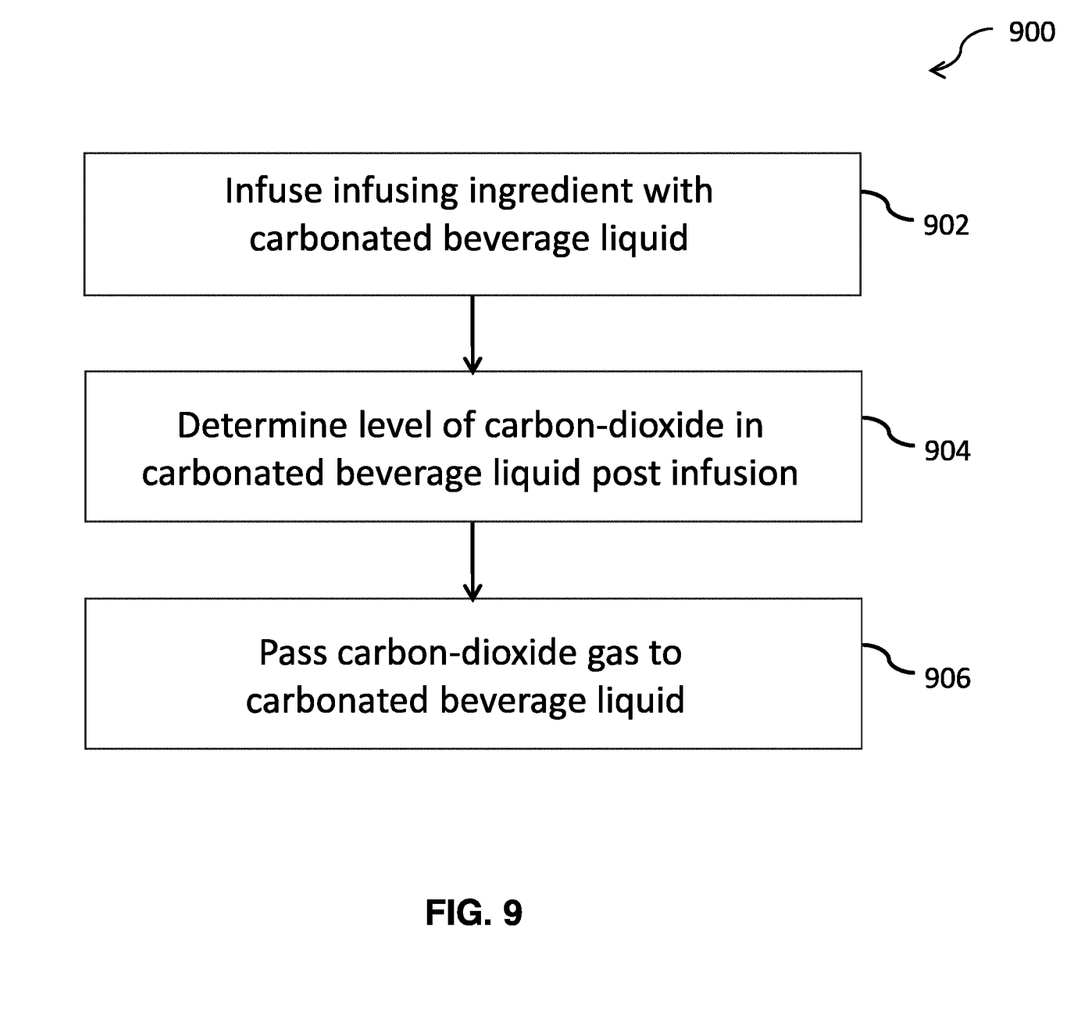
FIG. 9 is a flowchart illustrating steps for dispensing a carbonated beverage liquid, according to an embodiment of the present disclosure.

The present disclosure further provides a method, generally referred by a numeral 900, for dispensing a carbonated beverage liquid, and illustrated in the form of a flowchart in FIG. 9. In step 902, the method 900 includes infusing a solid ingredient with the liquid and thereby desorbing flavor components therein. Further, in step 904, the method 900 includes determining the level of carbon-dioxide in the liquid post the infusion process. At last, in step 906, the method 900 includes passing carbon-dioxide gas to the liquid based on the determined level of carbon-dioxide in the liquid, so as to bring the level of carbon-dioxide to the pre-defined level.

Referring to FIG. 9, methodology in accordance with a preferred embodiment of the claimed subject matter is illustrated. While, for purposes of simplicity of explanation, the methodology is shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

As will be readily apparent to those skilled in the art, the present invention may easily be produced in other specific forms without departing from its essential characteristics. The present embodiments is, therefore, to be considered as merely illustrative and not restrictive, the scope of the invention being indicated by the claims rather than the foregoing description, and all changes which come within therefore intended to be embraced therein. Many variations, modifications, additions, and improvements are possible. More generally, embodiments in accordance with the present disclosure have been described in the context of preferred embodiments. Functionalities may be separated or combined in procedures differently in various embodiments of the disclosure or described with different terminology. These and other variations, modifications, additions, and improvements may fall within the scope of the disclosure as defined in the appended claims.

The invention claimed is:

1. A dispensing apparatus, comprising:
   a beverage source containing a carbonated beverage liquid;
   a dispensing tap;
   a dispense tube disposing the beverage source in fluid communication with the dispensing tap;
   an infusion chamber arranged in connection with the dispense tube between the beverage source and the dispensing tap to receive the carbonated beverage liquid, the infusion chamber configured to infuse an infusing ingredient with the carbonated beverage liquid;
   a sensing unit positioned proximal to an outlet of the infusion chamber, the sensing unit configured to determine a level of carbon-dioxide in the carbonated beverage liquid downstream of the infusion chamber;
   a carbon-dioxide source coupled to the dispense tube downstream of the infusion chamber via a valve; and
   a control unit configured to operate the valve to allow flow of carbon-dioxide gas, from the carbon-dioxide source, to the carbonated beverage liquid based. on the determined level of carbon-dioxide in the carbonated beverage liquid, so as to bring the level of carbon-dioxide to a pre-defined level.

2. The dispensing apparatus according to claim 1, wherein the control unit is configured to at least partially restore the level of carbon-dioxide in the carbonated beverage liquid to a level prior to the infusion.

3. The dispensing apparatus according to claim 1, wherein the infusion chamber is arranged in-line with the dispense tube.

4. The dispensing apparatus according to claim 1 further comprising a carbonation chamber disposed downstream of the infusion chamber, the carbonation chamber comprising;
   a beverage inlet in fluid communication with the infusion chamber;
   a beverage outlet in fluid communication with the dispensing tap; and
   a carbon-dioxide inlet in fluid communication with the carbon-dioxide source.

5. The dispensing apparatus according to claim 4, wherein the carbonation chamber comprises a sparging device coupled to the carbon-dioxide inlet and configured to bubble the carbon-dioxide gas through the carbonated beverage liquid in the carbonation chamber.

6. The dispensing apparatus according to claim 4, wherein the carbonation chamber comprises at least one transparent wall.

7. The dispensing apparatus according to claim 4, wherein the sensing unit is further configured to determine a level of carbon-dioxide in the carbonated beverage liquid in the carbonation chamber.

8. The dispensing apparatus according to claim 1, wherein the sensing unit comprises a manometer.

9. The dispensing apparatus according to claim 1, wherein the sensing unit comprises one of an ultrasonic based meter, a capacitance based meter and a resistance based meter.

10. The dispensing apparatus according to claim 1, wherein the valve is a check valve.

11. The dispensing apparatus according to claim 1, wherein the carbonated beverage liquid is a malt-based carbonated beverage.

* * * * *